(12) United States Patent
Komiya et al.

(10) Patent No.: US 6,265,526 B1
(45) Date of Patent: Jul. 24, 2001

(54) SYSTEM AND PROCESS FOR PRODUCING POLYCONDENSATION POLYMER

(75) Inventors: Kyosuke Komiya, Kurashiki; Muneaki Aminaka, Okayama, both of (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/674,719

(22) PCT Filed: Jun. 16, 1999

(86) PCT No.: PCT/JP99/03207

§ 371 Date: Nov. 6, 2000

§ 102(e) Date: Nov. 6, 2000

(87) PCT Pub. No.: WO99/65970

PCT Pub. Date: Dec. 23, 1999

(30) Foreign Application Priority Data

Jun. 16, 1998 (JP) .................................................. 10-168399

(51) Int. Cl.[7] .................................................. C08G 64/00
(52) U.S. Cl. ............................................. 528/196; 528/198
(58) Field of Search .................................. 528/196, 198

(56) References Cited

U.S. PATENT DOCUMENTS 3,640,962   2/1972   Moshchel et al. .................... 528/176

4,716,214   12/1987   Gaymans et al. ..................... 528/335

FOREIGN PATENT DOCUMENTS

| 8059807 | 3/1996 | (JP) . |
| 8325373 | 12/1996 | (JP) . |
| 10324742 | 12/1998 | (JP) . |
| 10330465 | 12/1998 | (JP) . |

*Primary Examiner*—Terressa M. Boykin
(74) *Attorney, Agent, or Firm*—Birch, Stewart, Kolasch & Birch, LLP

(57) ABSTRACT

Disclosed is a system for producing a polycondensation polymer comprising (A) an inert gas absorption device for causing a molten polycondensation prepolymer to absorb an inert gas to thereby obtain ($\alpha$) a molten prepolymer having the inert gas absorbed therein, (B) a polymerizer device for polymerizing inert gas-absorbed molten prepolymer ($\alpha$) under reduced pressure, and (C) a pipe for transferring inert gas-absorbed molten prepolymer ($\alpha$) from absorption device (A) to polymerizer device (B), wherein absorption device (A) and polymerizer device (B) are arranged in this order and connected to each other through pipe (C). Also disclosed is a method for producing a polycondensation polymer by using the above-mentioned system. By the use of the system or method of the present invention, it has become possible to produce a colorless, high quality polycondensation polymer at high polymerization rate even without using a large amount of an inert gas.

16 Claims, 3 Drawing Sheets

SYSTEM AND PROCESS FOR PRODUCING POLYCONDENSATION POLYMER

BACKGROUND OF THE INVENTION

1. Field of the Invention

The present invention relates to a system for producing a polycondensation polymer. More particularly, the present invention is concerned with a system for producing a polycondensation polymer, comprising (A) an inert gas absorption device for causing a molten polycondensation prepolymer to absorb an inert gas to thereby obtain ($\alpha$) a molten prepolymer having the inert gas absorbed therein, (B) a polymerizer device for polymerizing the inert gas-absorbed molten prepolymer ($\alpha$) under a reduced pressure, and (C) a pipe for transferring the inert gas-absorbed molten prepolymer ($\alpha$) from absorption device (A) to polymerizer device (B), wherein absorption device (A) and polymerizer device (B) are arranged in this order and connected to each other through pipe (C). The present invention is also concerned with a method for producing a polycondensation polymer, which comprises: treating a molten polycondensation prepolymer with an inert gas in an inert gas absorption zone to cause the molten polycondensation prepolymer to absorb the inert gas, thereby obtaining an inert gas-absorbed molten prepolymer ($\alpha$); subsequently transferring the inert gas-absorbed molten prepolymer ($\alpha$) to a polymerization reaction zone; and subjecting the inert gas-absorbed molten prepolymer ($\alpha$) to polymerization in the polymerization reaction zone under a specific reduced pressure, to thereby polymerize the inert gas-absorbed molten prepolymer ($\alpha$) to a predetermined degree of polymerization. By the use of the system or the method of the present invention, it has become possible to produce a colorless, high quality polycondensation polymer at high polymerization rate even without using a large amount of an inert gas.

2. Prior Art

As methods for producing polycondensation polymers, such as polyesters, polyamides and polycarbonates, there are known an interfacial polycondensation process which uses a solvent and a melt polycondensation process which uses no solvent. In general, a process which uses a solvent has problems in that not only is a great deal of labor required to remove the solvent from the produced polymer, but also a small amount of the solvent remaining in the produced polymer adversely affects the properties of the polymer.

In the case of a melt polycondensation process, a polycondensation reaction involved in this process is an equilibrium reaction and, hence, a polycondensation polymer is generally produced while removing by-product(s) formed in the polycondensation reaction from the equilibrium polycondensation reaction system so as to displace the equilibrium to the product side. For example, water and ethylene glycol are removed from the reaction system in the production of polyethylene terephthalate, and water is removed from the reaction system in the production of hexamethylene adipamide (6,6 nylon). An efficient removal of the by-product(s) is important for efficiently producing a polycondensation polymer by the melt polycondensation process.

Various apparatuses and methods for producing polycondensation polymers by the melt polycondensation process have been known. For example, Examined Japanese Patent Application Publication No. 46-34083, Examined Japanese Patent Application Publication No. 50-19600 (corresponding to GB-1007302) and Examined Japanese Patent Application Publication No. 3-14052 disclose a horizontal agitation type polymerizer vessel equipped with a revolving shaft. In each of the above-mentioned publications, the horizontal agitation type polymerizer vessel equipped with a revolving shaft is used to renew the surface of the polymer by rotary agitation so as to promote the separation of the by-product(s) of the polycondensation reaction from the reaction system. However, this technique has the following problem. Generally, in order to remove the by-product(s) of the polycondensation reaction from the reaction system, the polycondensation reaction is conducted under a high vacuum. However, a polymerizer having a revolving shaft, in which the gap between the casing of the polymerizer and the revolving shaft is sealed, for example the horizontal agitation type polymerizer vessel mentioned above, has a problem in that air leakage is likely to occur at the sealed portion of the polymerizer. In addition, the quality of the produced polymer is lowered by the shear heat generated by the revolution of the revolving shaft.

Further, as polymerizers used for producing a polycondensation polymer, polymerizers which do not use a revolving shaft and, instead, allow a prepolymer to fall freely therein so as to effect the polymerization of the prepolymer during the free fall thereof have also been known. For example, Examined Japanese Patent Application Publication No. 48-8355 describes a polymerizer comprising a polymerizer casing containing therein a porous body extending in the substantially vertical direction, wherein the porosity of the porous body increases as from an upper end of the porous body toward a lower end of the porous body; a distribution device for the feedstock mixture fed into the polymerizer casing, which is disposed in the polymerizer casing at an upper portion thereof; an exhaustion means for removing gas generated during the reaction in the polymerizer casing, which is provided in association with the polymerizer casing; and a withdrawal means for the produced polymer, which is provided at a lower portion of the polymerizer casing. Unexamined Japanese Patent Application Laid-Open Specification No. 53-17569 describes an apparatus comprising a hollow body containing: a number of linear guides extending in the vertical direction; a nozzle for feeding a highly viscous prepolymer, which is provided above the linear guides; and a withdrawal means for the produced polymer, which is provided below the linear guides. Further, Examined Japanese Patent Application Publication No. 4-14127 discloses a continuous polycondensation method in which a prepolymer having an intrinsic viscosity of at least 0.1 is extruded through a slit orifice into a heated reactor vessel, and the resultant film of the prepolymer is held between two wires extending downwardly from the slit orifice and allowed to move contenuously in a downward direction. In the above-mentioned patent documents, it is attempted to remove efficiently the by-product(s) of the polycondensation reaction from the reaction system by increasing the surface area of the prepolymer during the fall thereof in the apparatus (i.e., by improving the surface renewal of the prepolymer during the polymerization). However, by the techniques disclosed in the above-mentioned patent documents, the surface renewal of the prepolymer is not always satisfactory and the polymerization rate is disadvantageously low.

Unexamined Japanese Patent Application Laid-Open Specification No. 63-104601 describes a method for removing volatile substances from a liquid by using an apparatus having disposed therein a belt conveyer, wherein a belt (carrier means) of the belt conveyer is moved at a predetermined speed, and a liquid to be treated is fed onto the belt at an upstream end portion of the belt conveyer, wherein the liquid forms a thin film on the belt and the volatile substances are removed by evaporation from the thin film of the liquid during the movement thereof on the belt conveyer. When this method is employed for the polycondensation reaction, the surface renewal of a prepolymer is improved as compared to that in the case of the above-mentioned apparatuses in which the polymerization of a prepolymer is effected during the fall of the prepolymer. However, since the belt conveyer in the above-mentioned apparatus needs to be driven by an outside power source, the apparatus necessarily has a sealed portion at which the gap between the casing of the apparatus and a means for transmitting the power provided by the outside power source to the belt conveyer is sealed. Therefore, as in the case of the horizontal agitation type polymerizer vessel mentioned above, this apparatus, having disposed therein a belt conveyer, has a problem in that air leakage is likely to occur at the sealed portion, and the air leakage causes a lowering of the quality of the produced polymer.

On the other hand, with respect to the melt polycondensation process for producing polycondensation polymers, it is widely known to effect a polymerization in the presence of an inert gas so as to remove by-product(s) from the reaction system. For example, Unexamined Japanese Patent Application Laid-Open Specification No. 6-206997 (corresponding to U.S. Pat. No. 5,384,389) describes a method in which an aromatic polycarbonate is produced by performing the equilibrium polycondensation reaction while continuously introducing an inert gas, together with a molten oligocarbonate, into a heated polymerizer under atmospheric pressure or under superatmospheric pressure in an amount of 1 m$^3$ or more per kg of the oligocarbonate, and removing by distillation phenol or the like (which is by-produced in the equilibrium polycondensation reaction) in such a form as entrained by the inert gas. However, such a method (in which the production of an aromatic polycarbonate is conducted while reducing the partial pressure of the by-produced phenol in the polymerizer by using a large amount of the inert gas) has a problem in that, for recycling the inert gas used in the polymerization reaction, a large separation device is necessary to separate the phenol from the inert gas. Each of the above-mentioned Examined Japanese Patent Application Publication No. 4-14127 and Unexamined Japanese Patent Application Laid-Open Specification No. 63-104601 also discloses a method for producing a polyester under the flow of an inert gas. In this method also, it is necessary to use a separation device for removing the by-produced ethylene contained in the inert gas. Therefore, this method has the same problem as mentioned above in connection with Unexamined Japanese Patent Application Laid-Open Specification No. 6-206997.

Further, in Unexamined Japanese Patent Application Laid-Open Specification No. 8-325373, the present inventors proposed a method in which the polymerization of a prepolymer is conducted by allowing the prepolymer to fall along and in contact with the surface of a guide, wherein the ratio of the partial pressure of the aromatic monohydroxy compound contained in the inert gas to the partial pressure of the inert gas is controlled within such a specific range that the recovery of the inert gas can be conducted even without using a large apparatus. However, in this method, it is difficult to achieve a sufficiently high polymerization rate.

In conventional methods in which an attempt is made to produce a polycondensation polymer by efficiently withdrawing by-product(s) from the polymerization reaction system by using an inert gas, as in the case of the above-mentioned Unexamined Japanese Patent Application Laid-Open Specification No. 6-206997, Examined Japanese Patent Application Publication No. 4-14127 and Japanese Patent Application Laid-Open Specification No. 63-104601, the inert gas is continuously introduced into a polymerizer so as to reduce the partial pressure of the by-product(s) in the polymerizer, to thereby advance the polymerization reaction. In the above-mentioned conventional methods, however, for effectively increasing the polymerization rate, it is necessary to use a large amount of the inert gas.

SUMMARY OF THE INVENTION

In this situation, for solving the above-mentioned various problems accompanying the melt polycondensation process using an inert gas for producing a polycondensation polymer, the present inventors have made extensive and intensive studies. As a result, they have unexpectedly found that, by using a system for producing a polycondensation polymer comprising (A) an inert gas absorption device for causing a molten polycondensation prepolymer to absorb an inert gas to thereby obtain (α) a molten prepolymer having the inert gas absorbed therein, (B) a polymerizer device for polymerizing inert gas-absorbed molten prepolymer (α), and (C) a pipe for transferring inert gas-absorbed molten prepolymer (α) from absorption device (A) to polymerizer device (B), wherein absorption device (A) and polymerizer device (B) are arranged in this order and connected to each other through pipe (C), a polycondensation polymer can be produced at high polymerization rate even without using a large amount of an inert gas. The present invention has been completed, based on this novel finding.

Accordingly, it is an object of the present invention to provide a system for producing a polycondensation polymer by the melt polycondensation process which is free from the problem of separating the polymer from a solvent, wherein the system is commercially very advantageous in that a colorless, high quality polycondensation polymer can be produced at high polymerization rate even without using a large amount of an inert gas.

It is another object of the present invention to provide a method which uses the above-mentioned system, and which is commercially very advantageous in that a colorless, high quality polycondensation polymer can be produced at high polymerization rate even without using a large amount of an inert gas.

The foregoing and other objects, features and advantages of the present invention will be apparent from the following detailed description and appended claims taken in connection with the accompanying drawing.

BRIEF DESCRIPTION OF THE DRAWINGS

In the drawings:

FIG. 1(*b*) is a diagrammatic cross-sectional view of the system of FIG. 1(*a*), taken along line I(b)—I(b) of FIG. 1(*a*);

FIG. 1(*c*) is a diagrammatic cross-sectional view of the system of FIG. 1(*a*), taken along line I(c)—I(c) of FIG. 1(*a*)

DESCRIPTION OF REFERENCE NUMERALS

Figure 1:
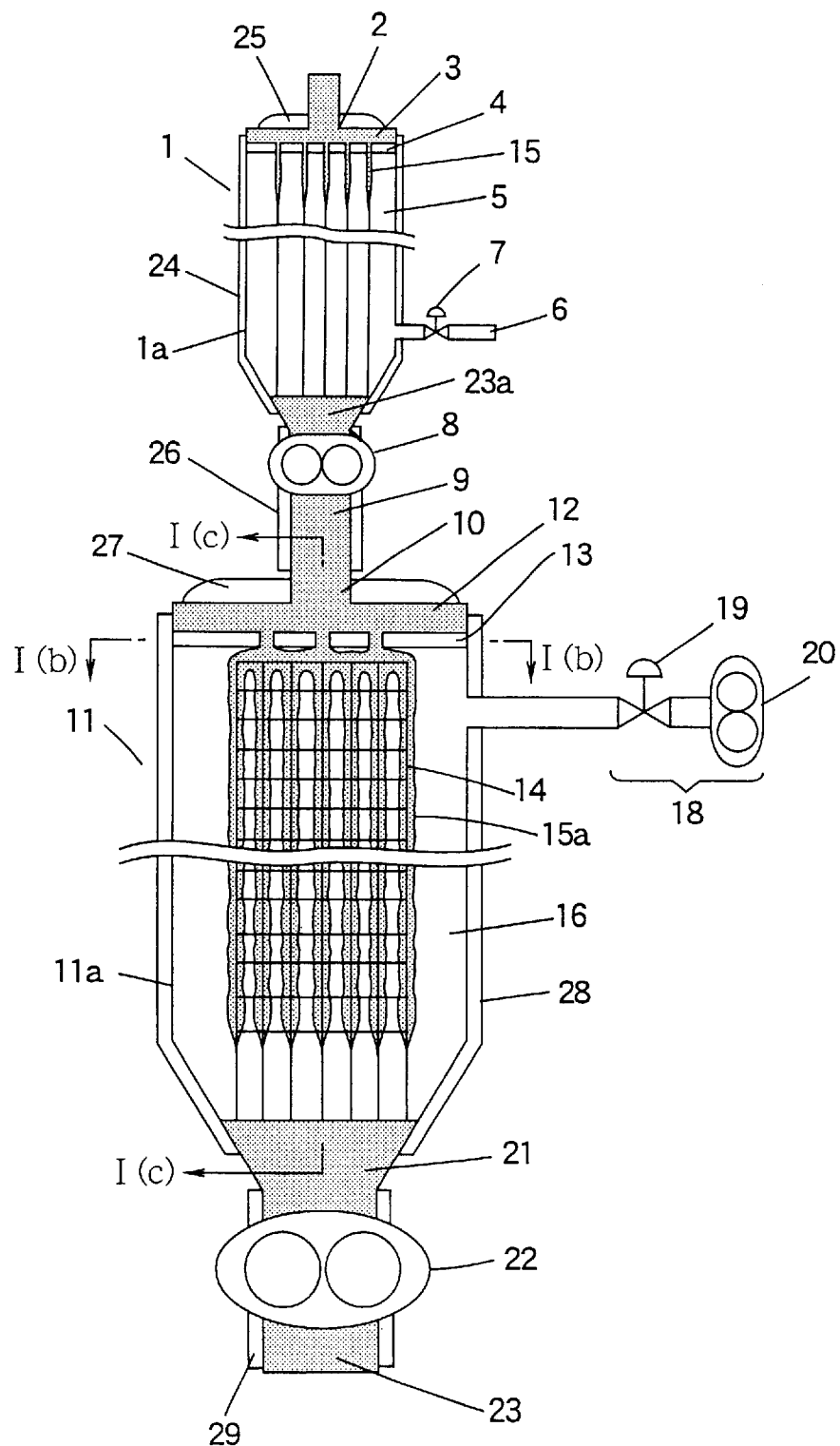
FIG. 1(*a*) is a diagrammatic view of one form of the system of the present invention.
Figure 1:
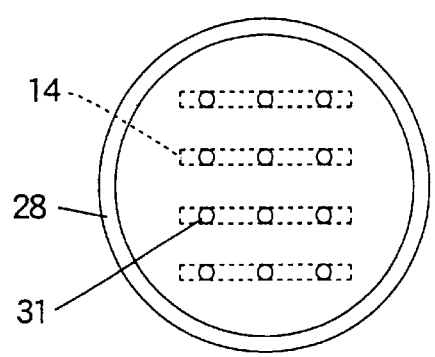
Figure 1:
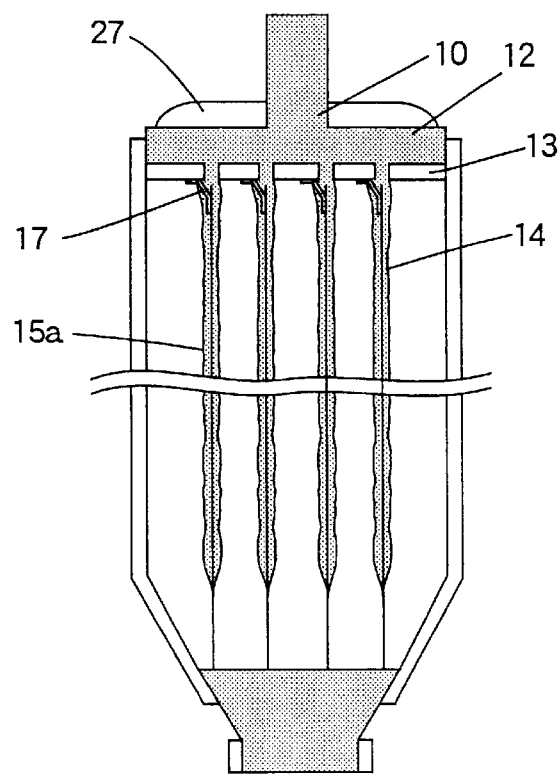

1: Inert gas absorption device
1*a*: Absorption casing
2: Inlet for molten polycondensation prepolymer 3: Molten polycondensation prepolymer feeding zone
4: Molten polycondensation prepolymer distribution plate
5: Inert gas absorption zone
6: Introduction port for inert gas
7: Pressure control valve for inert gas absorption device
8: Pump for transferring inert gas-absorbed molten prepolymer (α)
9: Pipe for transferring inert gas-absorbed molten prepolymer (α)
10: Inlet for inert gas-absorbed molten prepolymer (α)
11: Polymerizer device
11a: Polymerizer casing
12: Inert gas-absorbed molten prepolymer feeding zone
13: Inert gas-absorbed molten prepolymer distribution plate
14: Wire net guide
15: Molten polycondensation prepolymer to be caused to absorb an inert gas
15a: Inert gas-absorbed molten prepolymer (α) to be polymerized
16: Guide-wetting fall polymerization reaction zone
17: Fixing metallic member for fixing the guide
18: Evacuation device
19: Pressure control valve for polymerizer device
20: Vacuum pump
21: Polycondensation polymer
22: Withdrawal pump for polycondensation polymer
23: Outlet for polycondensation polymer
23a: Outlet for inert gas-absorbed molten prepolymer (α)
24, 25, 26, 27, 28, 29: Jacket
30: Valve for transferring inert gas-absorbed molten prepolymer (α)
31: Hole of distribution plate 13

DETAILED DESCRIPTION OF THE INVENTION

In one aspect of the present invention, there is provided a system for producing a polycondensation polymer, comprising:

(A) an inert gas absorption device for causing a molten polycondensation prepolymer to absorb an inert gas to thereby obtain (α) a molten prepolymer having the inert gas absorbed therein, (B) a polymerizer device for polymerizing inert gas-absorbed molten prepolymer (α), and (C) a pipe for transferring inert gas-absorbed molten prepolymer (α) from absorption device (A) to polymerizer device (B), pipe (C) being provided with means for controlling the flow rate of inert gas-absorbed molten prepolymer (α) passing therethrough, absorption device (A) and polymerizer device (B) being arranged in this order and connected to each other through pipe (C), absorption device (A) comprising an absorption casing having an inlet for the molten polycondensation prepolymer, an introduction port for the inert gas, an inert gas absorption zone for causing the molten polycondensation prepolymer to absorb the inert gas to thereby obtain inert gas-absorbed molten prepolymer (α), and an outlet for inert gas-absorbed molten prepolymer (α), wherein inert gas-absorbed molten prepolymer (α) is adapted to be withdrawn from absorption device (A) through the outlet for inert gas-absorbed molten prepolymer (α), and transferred to polymerizer device (B) through pipe (C), polymerizer device (B) comprising a polymerizer casing having an inlet for inert gas-absorbed molten prepolymer (α), an inert gas-absorbed molten prepolymer feeding zone positioned subsequent to and communicating with the inlet for inert gas-absorbed molten prepolymer (α) and a polymerization reaction zone positioned subsequent to the inert gas-absorbed molten prepolymer feeding zone, and an evacuation device provided in association with the polymerization reaction zone, the polymerizer casing being provided with an outlet for a polycondensation polymer through a withdrawal device positioned subsequent to the polymerization reaction zone, wherein inert gas-absorbed molten prepolymer (α) is adapted to be transferred to the polymerization reaction zone through the inert gas-absorbed prepolymer feeding zone and polymerized under a reduced pressure produced by means of the evacuation device, to thereby obtain a polycondensation polymer, and the obtained polycondensation polymer is adapted to be withdrawn from polymerizer device (B) through the outlet for a polycondensation polymer by means of the withdrawal device.

For easy understanding of the present invention, the essential features and various preferred embodiments of this aspect of the present invention are enumerated below.

1. A system for producing a polycondensation polymer exclusive of an aromatic polycarbonate comprising:

(A) an inert gas absorption device for causing a molten polycondensation prepolymer to absorb an inert gas to thereby obtain (α) a molten prepolymer having the inert gas absorbed therein, (B) a polymerizer device for polymerizing inert gas-absorbed molten prepolymer (α), and (C) a pipe for transferring inert gas-absorbed molten prepolymer (α) from absorption device (A) to polymerizer device (B), pipe (C) being provided with means for controlling the flow rate of inert gas-absorbed molten prepolymer (α) passing therethrough, absorption device (A) and polymerizer device (B) being arranged in this order and connected to each other through pipe (C), absorption device (A) comprising an absorption casing having an inlet for the molten polycondensation prepolymer, an introduction port for the inert gas, an inert gas absorption zone for causing the molten polycondensation prepolymer to absorb the inert gas to thereby obtain inert gas-absorbed molten prepolymer (α), and an outlet for inert gas-absorbed molten prepolymer (α), wherein inert gas-absorbed molten prepolymer (α) is adapted to be withdrawn from absorption device (A) through the outlet for inert gas-absorbed molten prepolymer (α), and transferred to polymerizer device (B) through pipe (C), polymerizer device (B) comprising a polymerizer casing having an inlet for inert gas-absorbed molten prepolymer (α), an inert gas-absorbed molten prepolymer feeding zone positioned subsequent to and communicating with the inlet for inert gas-absorbed molten prepolymer (α) and a polymerization reaction zone positioned subsequent to the inert gas-absorbed molten prepolymer feeding zone, and an evacuation device provided in association with the polymerization reaction zone, the polymerizer casing being provided with an outlet for a polycondensation polymer through a withdrawal device positioned subsequent to the polymerization reaction zone, wherein inert gas-absorbed molten prepolymer ($\alpha$) is adapted to be transferred to the polymerization reaction zone through the inert gas-absorbed prepolymer feeding zone and polymerized under a reduced pressure produced by means of the evacuation device, to thereby obtain a polycondensation polymer, and the obtained polycondensation polymer is adapted to be withdrawn from polymerizer device (B) through the outlet for a polycondensation polymer by means of the withdrawal device.

2. The system according to item 1, wherein the polymerization reaction zone is a guide-wetting fall polymerization reaction zone which has at least one guide fixedly held therein and extending downwardly therethrough, and the guide-wetting fall polymerization reaction zone is separated from the inert gas-absorbed molten prepolymer feeding zone through an inert gas-absorbed molten prepolymer distribution plate having at least one hole, through which the inert gas-absorbed molten prepolymer feeding zone communicates with the polymerization reaction zone, the guide being arranged in correspondence with the hole of the distribution plate, and wherein inert gas-absorbed molten prepolymer ($\alpha$) is adapted to fall along and in contact with the guide, to thereby effect a guide wetting-fall polymerization of inert gas-absorbed molten prepolymer ($\alpha$).

3. The system according to item 2, wherein the guide is a wire.

4. The system according to item 2, wherein the guide is a perforated guide which has a plurality of throughholes, each extending substantially in a thicknesswise direction of the guide, to thereby form openings in both surfaces of the guide.

5. The system according to item 4, wherein the perforated guide is a wire net.

6. The system according to item 4, wherein the perforated guide is a punched plate.

7. The system according to any one of items 1 to 6, wherein the polycondensation polymer is selected from the group consisting of an aliphatic polyester, an aliphatic polyamide, an aliphatic polycarbonate, an aliphatic aromatic polyester, an aliphatic aromatic polyamide, an aromatic polyester, and an aromatic polyamide.

The present invention is described below in detail.

Conventionally, in any of the methods for producing a polycondensation polymer in which an attempt is made to remove efficiently by-product(s) of the polycondensation reaction from the polymerization reaction system by using an inert gas, the inert gas is fed directly to a polymerizer which has an introduction port for the inert gas. However, it has unexpectedly become clear that, by using a system for producing a polycondensation polymer in which an inert gas absorption device for causing a molten polycondensation prepolymer to absorb an inert gas to thereby obtain inert gas-absorbed molten prepolymer ($\alpha$) is provided separately from a polymerizer device for polymerizing inert gas-absorbed molten prepolymer ($\alpha$), wherein the absorption device and the polymerizer device are arranged in this order and connected to each other, a polycondensation polymer can be produced at a remarkably improved polymerization rate by feeding only a small amount of the inert gas to the inert gas absorption device even without feeding the inert gas directly to the polymerizer device.

In the conventional methods, an inert gas is contenuously fed to and flowed through the inside of the polymerizer in an attempt to increase the polymerization rate. However, by such conventional methods, the polymerization rate cannot be satisfactorily increased. Apart from this defect of the conventional methods, the reason why the polymerization rate can be increased by such conventional methods is understood to be as follows. The polymerization reaction for producing a polycondensation polymer is an equilibrium reaction. Therefore, by removing the by-product(s) of the polycondensation reaction in such a form as entrained by the inert gas from the equilibrium reaction system, the partial pressure of the by-product(s) in the polymerizer is lowered, so that the equilibrium of the reaction is displaced to the product side to thereby advance the polymerization reaction. The above-mentioned conventional methods, however, are disadvantageous in that, for increasing the polymerization rate, an inert gas needs to be fed to the polymerizer in a large amount, so that various problems inevitably occur due to the use of such a large amount of inert gas.

On the other hand, by using the system of the present invention, it has unexpectedly become possible to increase the polymerization rate by using only a small amount of inert gas.

In the present invention, even when the amount of inert gas which is caused to be absorbed in a molten polycondensation prepolymer in the inert gas absorption device is very small as compared to the amount of inert gas used in the conventional methods, the polymerization rate can be increased. In such a case, the lowering of the partial pressure of the by-products in a polymerizer device is not sufficient for achieving a high polymerization rate. Therefore, the mechanism as to how the inert gas used in a small amount effectively serves to exert the excellent effects in the present invention has not yet been elucidated. According to the study made by the present inventors, it has surprisingly been observed that, when a molten prepolymer having an inert gas absorbed therein is polymerized, vigorous foaming of the molten prepolymer continuously occurs in the polymerizer, whereby the surface of the molten prepolymer is effectively renewed. Therefore, it is presumed that the above-mentioned foaming, which occurs throughout the molten prepolymer in the polymerizer to thereby effectively facilitate the surface renewal of the molten prepolymer, is effective for increasing the polymerization rate.

In the present invention, the "polycondensation polymer" means a polymer having a structure in which monomers of at least one type, each containing two or more functional groups capable of condensation, are bonded to each other through a linkage formed by the condensation of the functional groups. Each of the above-mentioned monomers can be either a monomer composed of an aliphatic hydrocarbon group having functional groups directly bonded thereto or a monomer composed of an aromatic hydrocarbon group having functional groups directly bonded thereto. The polycondensation polymer of the present invention is exclusive to an aromatic polycarbonate. Specific examples of polycondensation polymers include aliphatic polymers (in which aliphatic hydrocarbon groups are bonded to each other by condensation of the functional groups), such as an aliphatic polyester, an aliphatic polyamide and an aliphatic polycarbonate; and aliphatic aromatic polymers (in which aliphatic hydrocarbon groups and aromatic hydrocarbon groups are bonded to each other by condensation of the functional groups), such as an aliphatic aromatic polyester, an aliphatic aromatic polyamide and an aliphatic aromatic polycarbonate; and aromatic polymers (in which aromatic hydrocarbon groups are bonded to each other by condensation of the functional groups), such as an aromatic polyester and an aromatic polyamide. Each of the above-mentioned polycondensation polymers can be a homopolymer or a copolymer. Further, the polycondensation polymer can be a random or block copolymer containing different types of linkages, such as an ester linkage, a carbonate linkage and an amide linkage. As specific examples of such a copolymer, there can be mentioned a polyester carbonate and a polyester amide.

In the present invention, the "molten polycondensation prepolymer" means a molten low molecular weight polycondensation polymer which has a polymerization degree which is being increased by polycondensation and has not yet reached a desired level. Needless to say, such a molten prepolymer may be an oligomer.

The above-mentioned molten polycondensation prepolymer can be prepared by conventional methods. For example, a polyester prepolymer can be produced by subjecting a hydroxyl group-containing compound and a carboxyl group-containing compound to polycondensation; a polyamide prepolymer can be produced by subjecting an amide group-containing compound and a carboxyl group-containing compound to polycondensation; and a polycarbonate prepolymer can be produced by subjecting a compound comprising a carbonyl group having at both sides thereof a substituent bonded thereto (wherein the substituent is selected from the group consisting of an aryloxy group and an alkoxy group) and a hydroxyl group-containing compound to polycondensation. Illustratively stated, various polyester prepolymers can be produced as follows: an aliphatic polyester prepolymer can be produced by a polycondensation reaction between a monomer comprised of a $C_2$–$C_{30}$ aliphatic hydrocarbon group having at both sides thereof hydroxyl groups directly bonded thereto (e.g., ethylene glycol) and a monomer comprised of a $C_2$–$C_{30}$ aliphatic hydrocarbon group having at both sides thereof carboxyl groups directly bonded thereto (e.g., adipic acid); an aliphatic aromatic polyester prepolymer can be produced by a polycondensation reaction between a monomer comprised of a $C_2$–$C_{30}$ aliphatic hydrocarbon group having at both sides thereof hydroxyl groups directly bonded thereto (e.g., ethylene glycol) and a monomer comprised of a $C_6$–$C_{30}$ aromatic hydrocarbon group having at both sides thereof carboxyl groups directly bonded thereto (e.g., terephthalic acid); and an aromatic polyester prepolymer can be produced by a polycondensation reaction of a monomer comprised of a $C_6$–$C_{30}$ aromatic hydrocarbon group having at both sides thereof hydroxyl groups directly bonded thereto (e.g., bisphenol A) and a monomer comprised of a $C_6$–$C_{30}$ aromatic hydrocarbon group having at both sides thereof carboxyl groups directly bonded thereto (e.g., terephthalic acid). Various polyamide prepolymers can be produced as follows: an aliphatic polyamide prepolymer can be produced by a polycondensation reaction between a monomer comprised of a $C_2$–$C_{30}$ aliphatic hydrocarbon group having at both sides thereof carboxyl groups directly bonded thereto (e.g., adipic acid) and a monomer comprised of a $C_2$–$C_{30}$ aliphatic hydrocarbon group having at both sides thereof amino groups directly bonded thereto (e.g., hexamethylene diamine); an aliphatic aromatic polyamide prepolymer can be produced by a polycondensation reaction between a monomer comprised of a $C_6$–$C_{30}$ aromatic hydrocarbon group having at both sides thereof carboxyl groups directly bonded thereto (e.g., terephthalic acid) and a monomer comprised of a $C_2$–$C_{30}$ aliphatic hydrocarbon group having at both sides thereof amino groups directly bonded thereto (e.g., hexamethylene diamine); and an aromatic polyamide prepolymer can be produced by a polycondensation reaction between a monomer comprised of a $C_6$–$C_{30}$ aromatic hydrocarbon group having at both sides thereof carboxyl groups directly bonded thereto (e.g., terephthalic acid) and a monomer comprised of a $C_6$–$C_{30}$ aromatic hydrocarbon group having at both sides thereof amino groups directly bonded thereto (e.g., paraphenylene diamine). An aliphatic polycarbonate prepolymer can be produced by a polycondensation reaction between a monomer comprised of a $C_2$–$C_{30}$ aliphatic hydrocarbon group having at both sides thereof hydroxyl groups directly bonded thereto (e.g., 1,6-hexanediol) and a monomer comprised of a carbonyl group having at both sides thereof a phenoxy group (e.g., diphenyl carbonate). An aliphatic aromatic polycarbonate prepolymer can be produced by a polycondensation reaction between a monomer comprised of a $C_2$–$C_{30}$ aliphatic hydrocarbon group having at both sides thereof hydroxyl groups directly bonded thereto (e.g., 1,6-hexanediol), a monomer comprised of a $C_6$–$C_{30}$ aromatic hydrocarbon group having at both sides thereof hydroxyl groups directly bonded thereto (e.g., bisphenol A), and a monomer comprised of a carbonyl groups having at both sides thereof phenoxy groups bonded thereto (e.g., diphenyl carbonate).

Further, a molten mixture obtained simply by heat melting the above-mentioned monomers together can be used as a molten polycondensation prepolymer.

With respect to specific methods for producing the prepolymers mentioned above, reference can be made to, for example, "Polymer Synthesis, vol. 1, second edition", 1992 (published by Academic Press, Inc., U.S.A.).

The polymerization of the molten polycondensation prepolymer is caused by polycondensation between the functional groups at both terminals of each of the prepolymer chain. The terminal functional groups which undergo a polycondensation reaction may be the same or different. For example, the polymerization of a molten polycondensation prepolymer produced by reacting ethylene glycol and terephthalic acid may involve a polycondensation reaction between a terminal hydroxyl group and a terminal carboxyl group of each of the prepolymer chains, wherein water is by-produced, and/or a polycondensation reaction between both hydroxyl-terminals of each of the polymer chains, wherein ethylene glycol is by-produced.

The melt viscosity of the molten polycondensation prepolymer is preferably at least 0.001 Pa·s, more preferably 0.01 Pa·s, and preferably not more than 5,000 Pa·s, more preferably not more than 2,000 Pa·s. In the present invention, the "melt viscosity" means a melt viscosity as measured at the polymerization temperature employed while applying a shear rate of 1. When a molten polycondensation prepolymer having a melt viscosity of less than 0.001 Pa·s is polymerized by using a guide-wetting fall polymerizer which is described below in detail, the time for the prepolymer to fall along and in contact with a guide becomes short (that is, the reaction time becomes short) and, hence, it is likely to becomes difficult to achieve a satisfactorily high polymerization degree.

In addition, a polycondensation polymer produced by using the system of the present invention can be used as a molten polycondensation prepolymer, so that a polycondensation polymer having a further increased molecular weight can be obtained. A specific explanation on such a method is made below.

The term "inert gas" used in the present specification means a gas which has no reactivity with the molten polycondensation prepolymer and is stable under the conditions employed for the inert gas absorption and the polymerization. Specific examples of inert gases used in the method of the present invention include nitrogen, argon, helium and carbon dioxide. Further examples of inert gases include organic compounds which are in a gaseous state at temperatures at which the prepolymer maintains the molten state, such as a gaseous lower hydrocarbon having 1 to 8 carbon atoms. Of the above-mentioned inert gases, nitrogen is especially preferred.

Hereinbelow, an explanation is made on the system of the present invention for producing a polycondensation polymer.

With respect to the type of the devices used as inert gas absorption device (A), there is no particular limitation as long as it can be used for causing the molten prepolymer to absorb the inert gas. Examples of absorption devices used in the system of the present invention include conventional devices described in "Kagaku Souchi Sekkei Sousa Shiriizu No. 2, Kaitei Gasu Kyushu (Design and Operation of Chemical Apparatus, No. 2, Gas Absorption (Revised Version))", pp. 49–54 (published on Mar. 15, 1981 by Kagaku Kogyosha, Inc., Japan), such as a packed column type absorption device, a tray-containing column type absorption device, a spraying device-containing column type absorption device (in which a liquid is sprayed in a gas to be absorbed in the liquid), a turbulent contact absorption device, a gas-liquid film cross-contacting type absorption device, a high-speed rotary flow type absorption device, an absorption device utilizing mechanical force (such as agitation force), and a device in which the molten prepolymer is allowed to fall along and in contact with the surface of a guide in an atmosphere of an inert gas to thereby cause the molten prepolymer to absorb the inert gas during the fall thereof. In the present invention, it is especially preferred to use a spraying device-containing column type absorption device or a device in which the molten prepolymer is allowed to fall along and in contact with the surface of a guide in an atmosphere of an inert gas, to thereby cause the molten prepolymer to absorb the inert gas during the fall thereof.

Further, as inert gas absorption device (A), a device which is generally used as a polymerizer can also be used. However, when such a device (generally used as a polymerizer) is used as inert gas absorption device (A), the device is generally operated under conditions wherein the polymerization of the molten prepolymer hardly proceeds, so that the device does not function as a polymerizer.

In the present invention, there is no particular limitation with respect to the material used for inert gas absorption device (A). The material is generally selected from the group consisting of stainless steel, carbon steel, Hastelloy, nickel, titanium, chromium, other alloys, and a polymer having a high heat resistance.

With respect to the type of device used as polymerizer device (B), there is no particular limitation. Examples of devices usable as polymerizer device (B) include an agitation type reactor vessel, a wiped film type reactor, a centrifugal wiped film evaporation type reactor, a surface renewal type twin-screw kneading reactor, a twin-screw horizontal agitation type reactor, a wall-wetting fall reactor, a free-fall polymerizer device having a perforated plate (distribution plate), and a polymerizer device designed for performing a polymerization by allowing a prepolymer to fall along and in contact with the surface of a guide (hereinafter, frequently referred to as a "guide-wetting fall polymerizer device"). These various types of reactors can be used individually or in combination. As one of the preferred modes for producing a polycondensation polymer by using the system of the present invention, there can be mentioned a mode in which the molten prepolymer is prepared by polymerizing the raw material monomers by using a vertical agitation type reactor vessel, and the polymerization of the molten prepolymer is performed by using a surface renewal type twin-screw kneading reactor, a twin-screw horizontal agitation type reactor, a wall-wetting fall reactor, a free-fall polymerizer device having a perforated plate, or a polymerizer device designed for performing a polymerization by allowing a prepolymer to fall along and in contact with the surface of a guide (guide-wetting fall polymerizer device).

As polymerizer device (B), it is especially preferred to use the above-mentioned guide-wetting fall polymerizer device (with respect to the polymerization which is conducted by using this polymerizer device, reference can be made to, for example, U.S. Pat. No. 5,589,564). That is, in the present invention, it is preferred that the polymerization reaction zone of polymerizer device (B) is a guide-wetting fall polymerization reaction zone which has at least one guide fixedly held therein and extending downwardly therethrough, and the guide-wetting fall polymerization reaction zone is separated from the inert gas-absorbed molten prepolymer feeding zone through an inert gas-absorbed molten prepolymer distribution plate having at least one hole, through which the inert gas-absorbed molten prepolymer feeding zone communicates with the polymerization reaction zone, the guide being arranged in correspondence with the hole of the distribution plate, and wherein inert gas-absorbed molten prepolymer ($\alpha$) is adapted to fall along and in contact with the guide, to thereby effect a guide-wetting fall polymerization of inert gas-absorbed molten prepolymer ($\alpha$). It has been found that, when the above-mentioned inert gas-absorbed molten prepolymer ($\alpha$) is subjected to polymerization by using the guide-wetting fall polymerizer device, vigorous foaming of inert gas-absorbed molten prepolymer ($\alpha$) constantly occurs during the fall thereof in the polymerizer device, so that the surface of the molten prepolymer is very effectively and efficiently renewed. For this reason, in the present invention, it is most preferred to use as polymerizer device (B) the guide-wetting fall polymerizer device, wherein the molten prepolymer falling along and in contact with the surface of the guide maintains a foaming state throughout the prepolymer polymerization. The above description reading "the molten prepolymer falling along and in contact with the surface of the guide maintains a foaming state throughout the prepolymer polymerization" means that the foaming continuously occurs with respect to the whole of the molten prepolymer falling along and in contact with the guide from the upper portion of the guide through the lower portion of the guide. With respect to the foaming state of the molten prepolymer in polymerizer device (B), the foaming state can be, for example, visually observed through a sight glass provided on polymerizer device (B).

Hereinbelow, an explanation on the system of the present invention is made with reference to the accompanying drawings.

Inert gas absorption device (A) used in the system of the present invention is described in detail below, referring to FIG. 1(*a*). Inert gas absorption device 1 of FIG. 1(*a*) is a device in which a molten polycondensation prepolymer is allowed to fall from the upper portion of the device to the lower portion of the device to thereby cause the molten polycondensation prepolymer to absorb the inert gas during the fall thereof. Inert gas absorption device 1 comprises absorption casing 1*a* having inlet 2 for molten polycondensation prepolymer, molten polycondensation prepolymer feeding zone 3, molten polycondensation prepolymer distribution plate 4, inert gas absorption zone 5 and introduction port 6 for inert gas. Molten polycondensation prepolymer 15 is fed to molten polycondensation prepolymer feeding zone 3 from inlet 2 and allowed to pass downwardly through distribution plate 4 into inert gas absorption zone 5. In inert gas absorption zone 5, molten polycondensation prepolymer 15 is allowed to fall in a droplet form or a thread-like form while absorbing the inert gas during the fall thereof. Absorption casing 1a has introduction port 6 for introducing inert gas into inert gas absorption zone 5, and pressure control valve 7. Using pressure control valve 7, the inert gas can be fed into inert gas adsorption device 1 while constantly maintaining the inner pressure of inert gas absorption device 1 at a desired level. The amount of the inert gas absorbed in the molten polycondensation prepolymer in inert gas absorption device 1 can be controlled by changing the pressure of inert gas absorption zone 5. The higher the pressure employed in the inert gas absorption zone, the larger the amount of the inert gas absorbed in the molten polycondensation prepolymer. Inert gas-absorbed molten prepolymer (α) is withdrawn from outlet 23a.

There is no particular limitation with respect to the amount of the inert gas absorbed in the molten polycondensation prepolymer, but the amount of the inert gas absorbed in the molten polycondensation prepolymer is generally 1 to 10,000 ppm by weight, preferably 3 to 8,000 ppm by weight, most preferably 5 to 6,000 ppm by weight, based on the weight of the molten polycondensation prepolymer. Further, it is preferred that the polycondensation prepolymer is caused to absorb the inert gas in such an amount as constantly maintains inert gas-absorbed molten prepolymer (α) in a foaming state throughout the polymerization thereof to thereby efficiently effect the surface renewal of the prepolymer. The pressure of the inert gas absorption zone for causing the molten polycondensation prepolymer to absorb the inert gas in the above-mentioned amount may vary depending on the type of the polycondensation polymer to be produced, but such a pressure is generally 5,000 to 3,000,000 Pa, preferably 10,000 to 2,000,000 Pa, more preferably 20,000 to 1,500,000 Pa. It is preferred that inert gas absorption device 1 has a resistance to the pressures in the above-mentioned range. In the production of the polycondensation polymer by using the system of the present invention, in many cases, the temperature employed for causing the molten prepolymer to absorb the inert gas is similar to the polymerization temperature employed, and it is generally from 100 to 350° C. Inert gas absorption device 1 can be heated by using jackets 24 and 25.

As a preferred inert gas absorption device which is capable of causing a molten prepolymer to absorb an inert gas in high efficiency, there can be mentioned a device in which inert gas absorption zone 5 has therein at least one guide, such as wire or a wire net, and the molten polycondensation prepolymer is adapted to fall along and in contact with the guide to thereby cause the molten polycondensation prepolymer to absorb the inert gas during the fall thereof.

Next, polymerizer device (B) used in the system of the present invention is described in detail below, referring to FIGS. 1(a), 1(b) and 1(c).

In polymerizer device (B), inert gas-absorbed molten prepolymer (α) is polymerized to a predetermined degree of polymerization.

Polymerizer device 11 of FIG. 1(a) comprises polymerizer casing 11a having inert gas-absorbed molten prepolymer feeding zone 12 and polymerization reaction zone 16 positioned below inert gas-absorbed molten prepolymer feeding zone 12. Inert gas-absorbed molten prepolymer feeding zone 12 is separated from polymerization reaction zone 16 through inert gas-absorbed molten prepolymer (α) distribution plate 13. Polymerization reaction zone 16 has guides 14, which are fixed to either one or both of distribution plate 13 and the inner wall surface of polymerizer device 11, and extends downwardly through polymerization reaction zone 16. In polymerization reaction zone 16, inert gas-absorbed molten prepolymer (α) is allowed to fall along and in contact with guides 14 to thereby effect a guide-wetting fall polymerization of inert gas-absorbed molten prepolymer (α) (that is, polymerization reaction zone 16 is a guide-wetting fall polymerization zone). In addition, polymerizer device 11 has evacuation device 18 provided in association with polymerization reaction zone 16, which is used for conducting the polymerization reaction under a reduced pressure, and withdrawal device 22 for withdrawing the polycondensation polymer from polymerization reaction zone 16 which has a reduced pressure.

Molten prepolymer feeding zone 12 functions to distribute inert gas-absorbed molten prepolymer (α) 15(a) uniformly to the holes of distribution plate 13. When molten prepolymer feeding zone 12 cannot uniformly distribute inert gas-absorbed molten prepolymer (α) 15(a) to the holes of distribution plate 13, it is likely that the molecular weight of the obtained polycondensation polymer becomes ununiform, and the mechanical properties of the obtained polymer is lowered. The volume ($m^3$) of molten prepolymer (α) feeding zone 12 is generally in the range of from $0.001 \times F$ to $10 \times F$ ($m^3$), preferably from $0.003 \times F$ to $5 \times F$ ($m^3$), more preferably from $0.005 \times F$ to $2 \times F$ ($m^3$), wherein F means the flow rate ($m^3$/hr) of inert gas-absorbed molten prepolymer (α) 15a being passed through molten prepolymer (α) feeding zone 12. When the volume of molten prepolymer (α) feeding zone 12 is less than $0.001 \times F$ ($m^3$), it becomes difficult to distribute inert gas-absorbed molten prepolymer (α) 15a uniformly to the holes of distribution plate 13. When the volume of molten prepolymer (α) feeding zone 12 is more than $10 \times F$ ($m^3$), a problem is likely to arise that side reactions (such as a branching reaction and a gelation) occur, thereby lowering the quality (such as color) of the obtained polycondensation polymer. The pressure of inert gas-absorbed molten prepolymer (α) feeding zone 12 is generally in the range of from 10,000 to 5,000,000 Pa, preferably from 30,000 to 3,000,000 Pa. When the pressure of inert gas-absorbed molten prepolymer (α) feeding zone 12 is less than 10,000 Pa, it sometimes becomes difficult to distribute inert gas-absorbed molten prepolymer (α) 15a uniformly to the holes of distribution plate 13. There is no particular limitation with respect to the material used for a part of polymerizer device 11 which corresponds to feeding zone 12. The material is generally selected from stainless steel, carbon steel, Hastelloy, nickel, titanium, chromium, other alloys, and a polymer having a high heat resistance.

The surface of distribution plate 13 is generally selected from a flat surface, a corrugated surface, and a surface which is thick at a central portion thereof. The shape of the distribution plate is generally selected from a circle, an ellipse, a triangle, a polygon and the like. The thickness of the distribution plate is generally in the range of from 0.1 to 300 mm, preferably from 1 to 200 mm, more preferably from 5 to 150 mm. The distribution plate needs to have a resistance to the pressure of inert gas-absorbed molten prepolymer (α) feeding zone 12. Further, when the guide(s) is (are) fixed to the distribution plate, the distribution plate also needs to have a toughness sufficient to support the total weight of the guide(s) and inert gas-absorbed molten prepolymer (α) falling in contact with the guide(s). It is preferred that the distribution plate is supported by ribs and the like. The shapes of the openings of the holes of the distribution plate is generally selected from a circle, an ellipse, a triangle, a slit, a polygon, a star and the like. The area of each hole of the distribution plate is generally from 0.01 to 100 cm$^2$, preferably from 0.05 to 10 cm$^2$, more preferably from 0.1 to 5 cm$^2$. The distance between mutually adjacent holes is generally from 1 to 500 mm, preferably from 25 to 100 mm, as measured between the centers of the mutually adjacent holes. The hole of the distribution plate may be a through-hole formed in the distribution plate or a hollow portion of a tube which is attached to the distribution plate and has an opening thereof in the upper surface of the distribution plate. Further, the holes of the distribution plate may have a tapered configuration wherein the diameter of the hole decreases in the direction from the upper portion thereof to the lower portion thereof or in the direction from the lower portion thereof to the upper portion thereof. It is preferred that the size and shape of the holes of the distribution plate are selected so that the pressure loss of inert gas-absorbed molten prepolymer ($\alpha$) passing through the distribution plate is generally in the range of from 10,000 to 5,000,000 Pa, preferably from 30,000 to 3,000,000 Pa. The material used for the distribution plate is generally selected from stainless steel, carbon steel, Hastelloy, nickel, titanium, chromium and other alloys.

Polymerization reaction zone 16 has guides 14 for effecting guide-wetting fall polymerization of inert gas-absorbed molten prepolymer ($\alpha$), which are fixed to either one or both of distribution plate 13 and the inner wall surface of polymerizer device 11. It is preferred that guide 14 is a body which has a large magnitude in respect of the ratio of the length of the body (as measured in the direction perpendicular to the cross-section) to the average perimeter of the cross-sections of the body. The above ratio is generally from 10 to 1,000,000, preferably from 50 to 100,000. Specific examples of guides include a wire, a chain and a plate. Further, it is preferred that the guide is a perforated guide comprising two surfaces separated by a distance equal to a thickness of the guide, wherein the guide has a plurality of through-holes, each extending substantially in a thickness-wise direction of the guide, to thereby form openings in both surfaces of the guide. Specific examples of perforated guides include a wire net and a punched plate. Generally, the morphology of the cross-section of the guide is selected from a circle, an ellipse, a triangle, a quadrangle, a polygon having five or more sides, a star and the like. The morphology of the cross-section of the guide may be uniform or may vary along the length of the guide. The guide may be hollow. The guide may be made of a single strand of a wire or the like, or made of a plurality of strands, wherein, for example, the strands are twisted together. The surface of the guide may be smooth or rough or may have a protruding portion. In the system of the present invention, the polymerization reaction zone may have one guide or a plurality of guides, but it is preferred that the polymerization reaction zone has a plurality of guides. The number of guide(s) provided in the polymerization reaction zone is generally from 1 to 100,000, preferably from 3 to 50,000. When the polymerization reaction zone has a plurality of guides, it is preferred that a spacer or the like is provided between the guides so as to prevent the guides from being in contact with each other.

Guides 14 shown in FIGS. 1(a) to 1(c) are four wire net guides. Guides 14 and the holes of distribution plate 13 may or may not be in contact with each other. Preferred examples of guides 14 include a guide which extends downwardly through the hole of distribution plate 13 around the center of the hole; a guide which is in contact with the wall of the hole of distribution plate 13; and a guide having an upper end thereof positioned 1 to 100 mm below the lower surface of the distribution plate. The lower end of the guide may or may not be in contact with the liquid at the bottom of the polymerization reaction zone. In FIG. 1(a), guides 14 are not in contact with the liquid at the bottom of the polymerization reaction zone. Guides 14 are fixed to either one or both of distribution plate 13 and the inner wall surface of polymerizer device 11. In FIG. 1(c), guides 14 are fixed to distribution plate 13 by means of fixing metallic members 17 for the guides.

Polymerizer device 11 has evacuation device 18 which is provided in association with polymerization reaction zone 16 so as to conduct the polymerization reaction under a reduced pressure. Evacuation device 18 comprises pressure control valve 19 and vacuum pump 20. There is no particular limitation with respect to the type of vacuum pump used in the system of the present invention. Examples of vacuum pumps include various conventional wet vacuum pumps, such as a liquid-sealed pump, an oil rotary pump, a jet pump, a steam ejector, an oil ejector, an oil-diffusion ejector and an oil-diffusion pump; and dry vacuum pumps, such as a mechanical booster, a reciprocating pump and a gas ejector. If desired, the above-mentioned vacuum pumps can be used in combination. For condensing the by-product(s) of the polycondensation reaction, it is preferred that a cooler or a scrubber is provided between the vacuum pump and the polymerization reaction zone.

The polymerization in polymerization reaction zone 16 is conducted under a reduced pressure and, hence, a withdrawal device, such as withdrawal pump 22, is necessary for withdrawing the obtained polycondensation polymer 21 from polymerization reaction zone 16. There is no particular limitation with respect to the type of the withdrawal device used in the system of the present invention, but generally, it is preferred to use a screw-type withdrawal device or a gear pump. The obtained polycondensation polymer is withdrawn from polymerizer device 11 through outlet 23.

There is no particular limitation with respect to the material used for a portion of polymerizer device 11 which corresponds to polymerization reaction zone 16. The material is generally selected from stainless steel, carbon steel, Hastelloy, nickel, titanium, chromium and other alloys.

The polymerization in polymerization reaction zone 16 is preferably conducted at a pressure in the range of from 30 to 4,000 Pa. It is desired that the polymerizer device is designed to have a capability to prevent air leakage under a reduced pressure in the abovementioned range. When the polymerization pressure is higher than 4,000 Pa, the polymerization rate is likely to be disadvantageously lowered. Surprisingly, it has been found that the polymerization rate is also disadvantageously lowered when the polymerization pressure is less than 30 Pa. In the conventional methods for conducting the polycondensation reaction, the lowering of the polymerization pressure is advantageous from a viewpoint of ease in removing the by-products of the polycondensation reaction from the reaction system to thereby increase the polymerization rate. However, it has unexpectedly been found that, in the present invention, the polymerization rate is lowered when the polymerization pressure becomes too low. The reason for this has not yet been elucidated, but is considered to be as follows. When the polymerization pressure is less than 30 Pa, the inert gas in inert gas-absorbed prepolymer ($\alpha$) escapes from the prepolymer at an upper portion of the polymerizer device and, hence, the surface renewal of the inert gas-absorbed prepolymer (α) during the fall thereof becomes unsatisfactory. It is presumed that the unsatisfactory surface renewal of the prepolymer causes the lowering of the polymerization rate.

In the system of the present invention, the polymerization temperature is generally in the range of from 100 to 350° C. Polymerizer device 11 can be heated by using jackets 27, 28 and 29.

Figure 2:
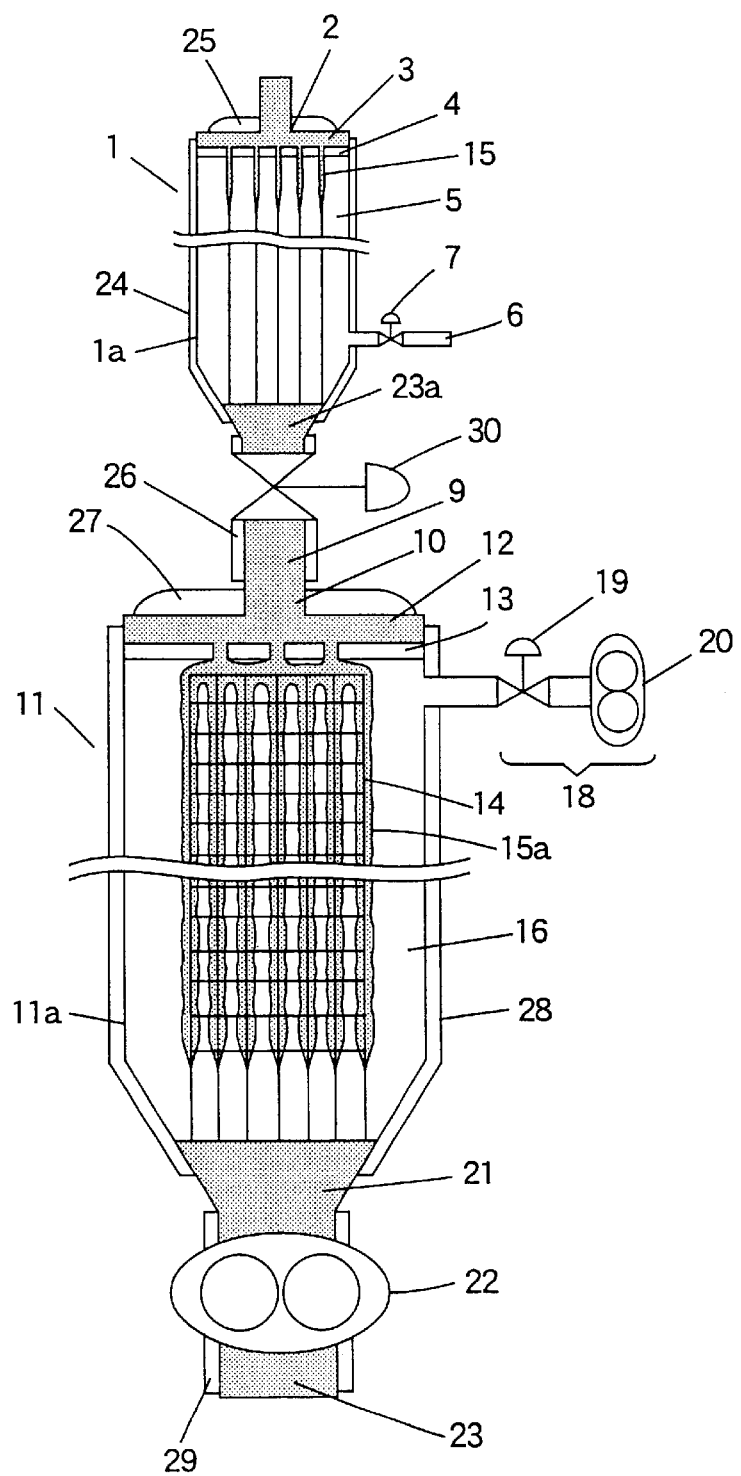
FIG. 2 is a diagrammatic view of another form of the system of the present invention.

In the system of the present invention, absorption device (A) and polymerizer device (B) are connected to each other through pipe (C) for transferring inert gas absorbed molten prepolymer (α) from absorption device (A) to polymerizer device (B), wherein pipe (C) is provided with a transfer device for inert gas-absorbed molten prepolymer (α). In FIG. 1(a), pipe 9 is provided with transfer pump 8 as a transfer device. There is no particular limitation with respect to the type of the transfer pump used, but generally, a gear pump, a Moineau pump or the like can be used. When the pressure of inert gas absorption device (A) is higher than that of inert gas-absorbed prepolymer (α) feeding zone of polymerizer device (B), the transfer device may be control valve 30 as shown in FIG. 2. In this case, transfer of inert gas-absorbed prepolymer (α) can be controlled simply by opening or closing the valve.

There is no particular limitation with respect to the material used for the pipe (C). The material is generally selected from stainless steel, carbon steel, Hastelloy, nickel, titanium, chromium and other alloys. As shown in FIG. 1(a), the pipe can be heated by using jacket 26.

The polycondensation reaction for producing the polycondensation polymer can be performed without using a catalyst. However, if desired, the reaction can also be performed in the presence of a catalyst for the purpose of increasing the polymerization rate. With respect to the catalyst, there is no particular limitation as long as the catalyst is conventionally used in the art.

In the present invention, it is preferred that the system of the present invention comprises a plurality of inert gas absorption devices (A) and a plurality of polymerizer devices (B). In this case,. it, of course, is possible that the number of polymerizer devices (B) used is larger than the number of inert gas absorption devices (A) used. There may be various arrangements of a plurality of inert gas absorption devices (A) and a plurality of polymerizer devices (B). As examples of the specific arrangements, there can be mentioned an arrangement in which inert gas absorption devices (A) and polymerizer devices (B) are arranged in the order of "an inert gas absorption device, a polymerizer device, an inert gas absorption device, a polymerizer device, an inert gas absorption device, a polymerizer device . . .", and an arrangement in which inert gas absorption devices (A) and polymerizer devices (B) are arranged in the order of "an inert gas absorption device, a polymerizer device, a polymerizer device, an inert gas absorption device, a polymerizer device . . . ". When the production of the polycondensation polymer is conducted by using the system of the present invention, instead of repeating the polymerization by using a plurality of polymerizer devices as mentioned above, the polycondensation polymer produced in a single polymerizer device may be recycled to the polymerizer device.

As apparent from the above, the technique comprising treating a molten polycondensation prepolymer with an inert gas in an inert gas absorption zone to cause the molten polycondensation prepolymer to absorb the inert gas, thereby obtaining inert gas-absorbed molten prepolymer (α), subsequently transferring inert gas-absorbed molten prepolymer (α) to a polymerization reaction zone, and subjecting inert gas-absorbed molten prepolymer (α) to polymerization in the polymerization reaction zone under a specific reduced pressure, to thereby polymerize the inert gas-absorbed molten prepolymer (α) to a predetermined degree of polymerization, is completely novel. By this novel technique, it has become possible to produce a colorless, high quality polycondensation polymer at high polymerization rate even without using a large amount of an inert gas. Such excellent effects are unexpected and surprising.

Accordingly, in another aspect of the present invention, there is provided a method for producing a polycondensation polymer, which comprises the steps of:

(1) treating a molten polycondensation prepolymer with an inert gas in an inert gas absorption zone to cause the molten polycondensation prepolymer to absorb the inert gas, thereby obtaining inert gas-absorbed molten prepolymer (α), (2) transferring inert gas-absorbed molten pre polymer (α) to a polymerization reaction zone, and (3) subjecting inert gas-absorbed molten prepolymer (α) to polymerization in the polymerization reaction zone under a pressure of 30 to 4,000 Pa, to thereby polymerize inert gas-absorbed molten prepolymer (α) to a predetermined degree of polymerization.

For easy understanding of the present invention, the essential features and various preferred modes of another aspect of the present invention are enumerated below.

①. A method for producing a polycondensation polymer exclusive of an aromatic polycarbonate which comprises the steps of:

(1) treating a molten polycondensation prepolymer with an inert gas in an inert gas absorption zone to cause the molten polycondensation prepolymer to absorb the inert gas, thereby obtaining inert gas-absorbed molten prepolymer (α), (2) transferring inert gas-absorbed molten pre polymer (α) to a polymerization reaction zone, and (3) subjecting inert gas-absorbed molten prepolymer (α) to polymerization in the polymerization reaction zone under a pressure of 30 to 4,000 Pa, to thereby polymerize inert gas-absorbed molten prepolymer (α) to a predetermined degree of polymerization.

②. The method according ①, wherein the polymerization reaction zone is a guide-wetting fall polymerization reaction zone having at least one guide fixedly held therein and extending downwardly therethrough, and inert gas-absorbed molten prepolymer (α) is allowed to fall along and in contact with the guide, to thereby effect a guide-wetting fall polymerization of inert gas-absorbed molten prepolymer (α).

③. The method according to ②, wherein the guide is a wire.

④. The method according to ②, wherein the guide is a perforated guide which has a plurality of through-holes, each extending substantially in a thicknesswise direction of the guide, to thereby form openings in both surfaces of the guide.

⑤. The method according to ④, wherein the perforated guide is a wire net.

⑥. The method according to item ④, wherein the perforated guide is a punched plate.

⑦. The method according to any one of items ① to ⑥, wherein the molten polycondensation prepolymer is caused to absorb the inert gas in the step (1) in such an amount as constantly maintains the inert gas-absorbed molten prepolymer (α) in a foaming state throughout the step (3) for polymerization.

⑧. Then method according to any one of items ① to ⑥, wherein the step (1) for inert gas absorption is performed under a pressure of 5,000 to 3,000,000 Pa.

⑨. The method according to any one of items ① to ⑧, wherein the polycondensation polymer is selected from the group consisting of an aliphatic polyester, an aliphatic polyamide, an aliphatic polycarbonate, an aliphatic aromatic polyester, an aliphatic aromatic polyamide, an aromatic polyester, and an aromatic polyamide.

The method of the present invention can be practiced advantageously by using the system of the present invention.

BEST MODE FOR CARRYING OUT THE INVENTION

Hereinbelow, the present invention will be described in more detail with reference to the following Examples and Comparative Examples, which should not be construed as limiting the scope of the present invention.

In the following Examples and Comparative Examples, the measurement of melt viscosity is conducted by using a capillary rheometer (manufactured and sold by Toyo Seiki Co., Ltd., Japan) wherein the shear rate applied in the measurement was 1.

EXAMPLE 1

An aliphatic aromatic polyester was produced by using a production system shown in FIG. 1(a), which comprises cylindrical, inert gas absorption device 1, cylindrical polymerizer device 11 and pipe 9. Absorption casing 1a of inert gas absorption device 1 has therein molten polycondensation prepolymer distribution plate 4 which has a thickness of 3 cm and has ten holes each having a diameter of 1.5 mm. Inert gas absorption zone 5 has a diameter of 0.2 m and a height of 4 m. Polymerizer casing 11a of polymerizer device 11 has therein inert gas-absorbed molten prepolymer feeding zone 12 having a volume of 0.00035 m³. Guide-wetting fall polymerization reaction zone 16 has a diameter of 0.3 m. Polymerization reaction zone 16 has therein four wire net guides 14, each made of a SUS304 wire having a diameter of 3 mm. Each of wire net guides 14 has a width of 21.3 cm, a height of 8 m and a line pitch of 3 cm. Wire net guides 14 are respectively fixed to inert gas-absorbed molten prepolymer distribution plate 13 by means of fixing metallic members 17 for the guides (see FIG. 1(C)). Four wire net guides 14 are arranged in parallel to each other at intervals of 4 cm. The upper end of guide 14 is positioned 3 cm below inert gas-absorbed molten prepolymer distribution plate 13, and the lower free end of guide 14 is at a level at which the profile of the polymerizer casing 11a changes from the cylindrical shape to the conical shape as seen from FIG. 1(a). Inert gas-absorbed molten prepolymer distribution plate 13 has a thickness of 3 cm and has twelve holes which are arranged so that four sets of three holes are positioned above four guides 14, respectively (see FIG. 1(b)). In each of the four sets of three holes, the holes are arranged at intervals of 7 cm. Each of the holes has a diameter of 1.5 mm.

To inert gas absorption device 1 was fed, through inlet 2 for molten polycondensation prepolymer, a molten aliphatic aromatic polyester prepolymer which had been produced from ethylene glycol and terephthalic acid, and which contained diantimony trioxide as a catalyst in an amount of 200 ppm and had a melt viscosity of 0.5 Pa·s at 280° C., wherein the feed rate of the molten aliphatic aromatic polyester prepolymer was 40 kg/hr. Nitrogen gas was fed to inert gas absorption zone 5 through introduction port 6 for an inert gas. The pressure in inert gas absorption zone 5 was maintained at 150,000 Pa by pressure control valve 7 for inert gas absorption device. The temperature of the molten prepolymer fed to inert gas absorption device 1 was 280° C. Inert gas absorption device 1 was heated to 280° C. by jackets 24 and 25. The amount of the nitrogen gas absorbed in the molten prepolymer was 50 ppm by weight, based on the weight of the molten prepolymer (the nitrogen absorption rate: 1.6 N liters (l)/hr) (Nl means l as measured under the normal temperature and pressure conditions). During the operation of the system of FIG. 1, the molten prepolymer having the nitrogen gas absorbed therein was fed to polymerizer device 11 by means of pump 8 for transferring inert gas-absorbed molten prepolymer (α) so that the amount of molten prepolymer at the bottom of inert gas absorption zone 5 was constantly maintained at a predetermined level. Pipe 9 for transferring inert gas-absorbed molten prepolymer (α) was heated to 280° C. by jacket 26. The pressure in guide-wetting fall polymerization reaction zone 16 was adjusted to and maintained at 200 Pa by evacuation device 18. Polymerizer device 11 was heated to 280° C. by jackets 27, 28 and 29. The molten prepolymer fed to polymerizer device 11 was allowed to fall along and in contact with guides 14 for performing a polymerization reaction of the molten prepolymer to thereby obtain an aliphatic aromatic polyester. During the polymerization reaction, the produced aliphatic aromatic polyester was withdrawn by means of withdrawal pump 22 for polycondensation polymer so that the amount of aliphatic aromatic polyester at the bottom of polymerization zone 16 was constantly maintained at a predetermined level. In polymerization zone 16, the surface of the liquid (aliphatic aromatic polyester) at the bottom of polymerization zone 16 was below the lower ends of wire net guides 14. The melt viscosity of the aliphatic aromatic polyester withdrawn through outlet 23 for polycondensation polymer was 320 Pa·s at 280° C.

COMPARATIVE EXAMPLE 1

An aliphatic aromatic polyester was produced in substantially the same manner as in Example 1, except that the molten prepolymer was not passed through inert gas absorption device 1 but fed directly to polymerizer device 11 through inlet 10 for inert gas-absorbed molten prepolymer. The melt viscosity (at 280° C.) of the aliphatic aromatic polyester withdrawn through outlet 23 was 160 Pa·s. By comparing Comparative Example 1 with Example 1 with respect to the melt viscosity, it becomes clear that the difference between the melt viscosity before the polymerization and that after the polymerization in Comparative Example 1 is small, namely, the polymerization rate in Comparative Example 1 is low.

COMPARATIVE EXAMPLE 2

An aliphatic aromatic polyester was produced in substantially the same manner as in Example 1, except that the molten prepolymer was not passed through inert gas absorption device 1 but fed directly to polymerizer device 11 through inlet 10 and that nitrogen gas was fed to polymerizer device 11 through an introduction port (not shown) for introducing an inert gas into guide-wetting fall polymerization reaction zone 16 (the nitrogen absorption rate: 16 Nl/hr). The melt viscosity (at 280° C.) of the aliphatic aromatic polyester withdrawn through outlet 23 was 230 Pa·s. By comparing Comparative Example 2 with Example 1 with respect to the melt viscosity, it becomes clear that the difference between the melt viscosity before the polymerization and that after the polymerization in Comparative Example 2 is small, namely, the polymerization rate in Comparative Example 2 is low, in spite of the fact that the nitrogen gas was used in a large amount, as compared to that in Example 1.

EXAMPLE 2

An aromatic polyester was produced in substantially the same manner as in Example 1, except that a molten aromatic polyester prepolymer, which had been produced from phenyl terephthalate, phenyl isophthalate and bisphenol A (wherein the phenyl terephthalate/phenyl isophthalate molar ratio was 1:1), and which contained 5 ppm of NaOH (as a catalyst) and had a melt viscosity of 2 Pa·s at 300° C., was fed to inert gas absorption device 1, that the temperature of the molten prepolymer fed to inert gas absorption device 1 was changed to 300° C. and the temperature of each of jackets 24, 25, 26, 27, 28 and 29 was changed to 300° C. and that the polymerization pressure was changed to 40 Pa. The melt viscosity (at 300° C.) of the aromatic poly ester withdrawn through outlet 23 was 3,200 Pa·s.

EXAMPLE 3

An aliphatic aromatic polyester was produced in substantially the same manner as in Example 1, except that a molten aliphatic aromatic polyester prepolymer, which had been produced from 1,4-butanediol and terephthalic acid, and which contained 200 ppm of antimony trioxide (as a catalyst) and had a melt viscosity of 0.8 Pa·s at 280° C., was fed to inert gas absorption device 1. The melt viscosity (at 280° C.) of the aliphatic aromatic polyester withdrawn through outlet 23 was 360 Pa·s.

EXAMPLE 4

An aliphatic aromatic polyester was produced in substantially the same manner as in Example 1, except that a molten aliphatic aromatic polyester prepolymer, which had been produced from ethylene glycol and 5,9-dicarboxynaphthalene, and which contained 200 ppm of antimony trioxide (as a catalyst) and had a melt viscosity of 1.5 Pa·s at 310° C., was fed to inert gas absorption device 1 and that the temperature of the molten prepolymer fed to inert gas absorption device 1 was changed to 310° C. and the temperature of each of jackets 24, 25, 26, 27, 28 and 29 was changed to 310° C. The melt viscosity (at 310° C.) of the aliphatic aromatic polyester withdrawn through outlet 23 was 1,100 Pa·s.

EXAMPLE 5

An aliphatic polyamide was produced in substantially the same manner as in Example 1, except that a molten aliphatic polyamide prepolymer, which had been produced from hexamethylenediamine and adipic acid and had a melt viscosity of 1 Pa·s at 290° C., was fed to inert gas absorption device 1, that the temperature of the molten prepolymer fed to inert gas absorption device 1 was changed to 290° C. and the temperature of each of jackets 24, 25, 26, 27, 28 and 29 was changed to 290° C. and that the polymerization pressure was changed to 300 Pa. The melt viscosity (at 290° C.) of the aliphatic polyamide withdrawn through outlet 23 was 120 Pa·s.

EXAMPLE 6

An aliphatic aromatic polyester was produced in substantially the same manner as in Example 1, except that the polymerization pressure was changed to 40 Pa. The melt viscosity (at 280° C.) of the aliphatic aromatic polyester withdrawn through outlet 23 was 350 Pa·s.

REFERENCE EXAMPLES 1 AND 2

(In each of these Reference Examples, the system of the present invention was employed; however, the operation of the system was inappropriate with respect to the polymerization pressure)

In Reference Examples 1 and 2, aliphatic aromatic polyesters were respectively produced in substantially the same manner as in Example 1, except that the polymerization pressures were 25 Pa (Reference Example 1) and 5,000 Pa (Reference Example 2), respectively. The melt viscosities (at 280° C.) of the aliphatic aromatic polyesters withdrawn through outlet 23 were 250 Pa·s (Reference Example 1) and 230 Pa·s (Reference Example 2), respectively.

EXAMPLE 7

An aliphatic polycarbonate was produced in substantially the same manner as in Example 1, except that a molten aliphatic polycarbonate prepolymer, which had been produced from ethylene carbonate and 1,4-butanediol (1,4-butanediol/ethylene carbonate molar ratio=1:1.13), and which contained 10 ppm of lead acetate (as a catalyst) and had a number average molecular weight of 400, as measured by gel permeation chromatography (GPC), was fed to inert gas absorption device 1, that the temperature of the molten prepolymer fed to inert gas absorption device 1 was changed to 145° C. and the temperature of each of jackets 24, 25, 26, 27, 28 and 29 was changed to 145° C. and that the polymerization pressure was changed to 250 Pa. The number average molecular weight (as measured by GPC) of the aliphatic polycarbonate withdrawn through outlet 23 was 2,020.

EXAMPLE 8

An aliphatic polycarbonate was produced in substantially the same manner as in Example 1, except that a molten aliphatic polycarbonate prepolymer which had been produced from ethylene carbonate, 1,5-pentanediol and 1,6-hexanediol (1,5-pentanediol/1,6-hexanediol/ethylene carbonate molar ratio=1:1:2.2), which contained 10 ppm of lead acetate (as a catalyst) and had a number average molecular weight (as measured by GPC) of 400, was fed to inert gas absorption device 1, that the temperature of the molten prepolymer fed to inert gas absorption device 1 was changed to 160° C. and the temperature of each of jackets 24, 25, 26, 27, 28 and 29 was changed to 160° C. and that the polymerization pressure was changed to 250 Pa. The number average molecular weight (as measured by GPC) of the aliphatic polycarbonate withdrawn through outlet 23 was 2,210.

INDUSTRIAL APPLICABILITY

In the production of polycondensation polymers by the melt polycondensation process which can be practiced without a need for the separation of polymer products from solvents, by using the system and method of the present invention, colorless, high quality polycondensation polymers can be produced at high polymerization rate even without using a large amount of an inert gas. Therefore, the system and the method of the present invention are commercially very advantageous.

What is claimed is:

1. A system for producing a polycondensation polymer exclusive of an aromatic polycarbonate, comprising:
   (A) an inert gas absorption device for causing a molten polycondensation prepolymer to absorb an inert gas to thereby obtain ($\alpha$) a molten prepolymer having said inert gas absorbed therein,
   (B) a polymerizer device for polymerizing said inert gas-absorbed molten prepolymer ($\alpha$), and
   (C) a pipe for transferring said inert gas-absorbed molten prepolymer ($\alpha$) from said absorption device (A) to said polymerizer device (B), said pipe (C) being provided with means for controlling the flow rate of said inert gas-absorbed molten prepolymer ($\alpha$) passing therethrough,
   said absorption device (A) and said polymerizer device (B) being arranged in this order and connected to each other through said pipe (C),
   said absorption device (A) comprising an absorber casing having an inlet for said molten polycondensation prepolymer, an introduction port for said inert gas, an inert gas absorption zone for causing said molten polycondensation prepolymer to absorb said inert gas to thereby obtain said inert gas-absorbed molten prepolymer ($\alpha$), and an outlet for said inert gas-absorbed molten prepolymer ($\alpha$),
   wherein said inert gas-absorbed molten prepolymer ($\alpha$) is adapted to be withdrawn from said absorption device (A) through said outlet for inert gas-absorbed molten prepolymer ($\alpha$), and transferred to said polymerizer device (B) through said pipe (C),
   said polymerizer device (B) comprising a polymerizer casing having an inlet for said inert gas-absorbed molten prepolymer ($\alpha$), an inert gas-absorbed molten prepolymer feeding zone positioned subsequent to and communicating with said inlet for inert gas-absorbed molten prepolymer ($\alpha$) and a polymerization reaction zone positioned subsequent to said inert gas-absorbed molten prepolymer feeding zone, and an evacuation device provided in association with said polymerization reaction zone,
   said polymerizer casing being provided with an outlet for a polycondensation polymer through a withdrawal device positioned subsequent to said polymerization reaction zone,
   wherein said inert gas-absorbed molten prepolymer ($\alpha$) is adapted to be transferred to said polymerization reaction zone through said inert gas-absorbed prepolymer feeding zone and polymerized under a reduced pressure produced by means of said evacuation device, to thereby obtain a polycondensation polymer, and the obtained polycondensation polymer is adapted to be withdrawn from said polymerizer device (B) through said outlet for a polycondensation polymer by means of said withdrawal device.

2. The system according to claim 1, wherein said polymerization reaction zone is a guide-wetting fall polymerization reaction zone which has at least one guide fixedly held therein and extending downwardly therethrough, and said guide-wetting fall polymerization reaction zone is separated from said inert gas-absorbed molten prepolymer feeding zone through an inert gas-absorbed molten prepolymer distribution plate having at least one hole, through which said inert gas-absorbed molten prepolymer feeding zone communicates with said polymerization reaction zone, said guide being arranged in correspondence with the hole of said distribution plate, and
   wherein said inert gas-absorbed molten prepolymer ($\alpha$) is adapted to fall along and in contact with said guide, to thereby effect a guide-wetting fall polymerization of said inert gas-absorbed molten prepolymer ($\alpha$).

3. The system according to claim 2, wherein said guide is a wire.

4. The system according to claim 2, wherein said guide is a perforated guide which has a plurality of through-holes, each extending substantially in a thicknesswise direction of said guide, to thereby form openings in both surfaces of said guide.

5. The system according to claim 4, wherein said perforated guide is a wire net.

6. The system according to claim 4, wherein said perforated guide is a punched plate.

7. The system according to any one of claims 1 to 6, wherein said polycondensation polymer is selected from the group consisting of an aliphatic polyester, an aliphatic polyamide, an aliphatic polycarbonate, an aliphatic aromatic polyester, an aliphatic aromatic polyamide, an aromatic polyester, and an aromatic polyamide.

8. A method for producing a polycondensation polymer exclusive of an aromatic polycarbonate, which comprises the steps of:
   (1) treating a molten polycondensation prepolymer with an inert gas in an inert gas absorption zone to cause said molten polycondensation prepolymer to absorb said inert gas, thereby obtaining an inert gas-absorbed molten prepolymer ($\alpha$),
   (2) transferring said inert gas-absorbed molten prepolymer ($\alpha$) to a polymerization reaction zone, and
   (3) subjecting said inert gas-absorbed molten prepolymer ($\alpha$) to polymerization in said polymerization reaction zone under a pressure of 30 to 4,000 Pa, to thereby polymerize said inert gas-absorbed molten prepolymer ($\alpha$) to a predetermined degree of polymerization.

9. The method according to claim 8, wherein said polymerization reaction zone is a guide-wetting fall polymerization reaction zone having at least one guide fixedly held therein and extending downwardly therethrough, and said inert gas-absorbed molten prepolymer ($\alpha$) is allowed to fall along and in contact with said guide, to thereby effect a guide-wetting fall polymerization of said inert gas-absorbed molten prepolymer ($\alpha$).

10. The method according to claim 9, wherein said guide is a wire.

11. The method according to claim 9, wherein said guide is a perforated guide which has a plurality of through-holes, each extending substantially in a thicknesswise direction of said guide, to thereby form openings in both surfaces of said guide.

12. The method according to claim 11, wherein said perforated guide is a wire net.

13. The method according to claim 11, wherein said perforated guide is a punched plate.

14. The method according claim 8, wherein said molten polycondensation prepolymer is caused to absorb said inert gas in said step (1) in such an amount as constantly maintains said inert gas-absorbed molten prepolymer ($\alpha$) in a foaming state throughout said step (3) for polymerization.

15. The method according to claim 8, wherein said step (1) for inert gas absorption is performed under a pressure of 5,000 to 3,000,000 Pa.

16. The method according to claim 8, wherein said polycondensation polymer is selected from the group consisting of an aliphatic polyester, an aliphatic polyamide, an aliphatic polycarbonate, an aliphatic aromatic polyester, an aliphatic aromatic polyamide, an aromatic polyester, and an aromatic polyamide.

* * * * *